US006408057B1

United States Patent
Lee et al.

(10) Patent No.: US 6,408,057 B1
(45) Date of Patent: *Jun. 18, 2002

(54) TELEPHONE LINE INTERFACING CIRCUIT USED FOR BOTH VOICE AND NON-VOICE TERMINALS AND METHOD FOR CONTROLLING THE SAME

(75) Inventors: Young-Soo Lee, Seongnam; Hyun-Chang Yoo, Seoul; Sang-Yong Han, Suwon; Young-Chul Kim, Seoul, all of (KR)

(73) Assignee: Samsung Electronics, Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/855,904

(22) Filed: May 14, 1997

(30) Foreign Application Priority Data

May 14, 1996 (KR) .............................. 96-16020
Mar. 15, 1997 (KR) .............................. 97-8851

(51) Int. Cl.⁷ .......................................... H04M 11/00
(52) U.S. Cl. ........................ 379/93.09; 379/100.09; 379/100.14
(58) Field of Search ...................... 379/93.05, 93.09, 379/93.14, 93.15, 93.36, 100.09, 100.14–100.16, 355, 359, 361, 110.01, 164; 358/400, 407, 440, 442, 468

(56) References Cited

U.S. PATENT DOCUMENTS

| | | | | |
|---|---|---|---|---|
| 4,367,374 A | * | 1/1983 | Serrano .................... | 379/93.09 |
| 4,821,312 A | * | 4/1989 | Horton et al. ............ | 379/93.09 |
| 4,916,732 A | * | 4/1990 | Kotani et al. ............ | 379/100.14 |
| 5,018,189 A | * | 5/1991 | Kurosawa et al. ...... | 379/100.15 |
| 5,187,736 A | * | 2/1993 | Moriizumi ............. | 379/100.15 |
| 5,289,533 A | * | 2/1994 | Wasio et al. ............ | 379/100.14 |
| 5,337,349 A | * | 8/1994 | Furohasi et al. ........ | 379/100.14 |
| 5,375,165 A | * | 12/1994 | Haber et al. ............ | 379/110.01 |
| 5,428,674 A | * | 6/1995 | Kawashima ........... | 379/100.14 |
| 5,481,373 A | * | 1/1996 | Ikeguchi et al. ....... | 379/100.16 |
| 5,610,975 A | * | 3/1997 | Tsuchida ................ | 379/100.15 |
| 5,644,633 A | * | 7/1997 | Kaufeld et al. ......... | 379/100.14 |
| 5,680,449 A | * | 10/1997 | Terajima et al. ........ | 379/100.14 |
| 5,706,340 A | * | 1/1998 | Saji .......................... | 379/353 |
| 5,857,010 A | * | 1/1999 | Chiba ....................... | 379/164 |

FOREIGN PATENT DOCUMENTS

| | | | | |
|---|---|---|---|---|
| DE | 4417 387 A1 | 11/1995 | .......... | H04M/11/00 |
| JP | 01051752 | * 2/1989 | .............. | 379/93.14 |

* cited by examiner

*Primary Examiner*—Curtis Kuntz
*Assistant Examiner*—George Eng
(74) *Attorney, Agent, or Firm*—Dilworth & Barrese, LLP

(57) ABSTRACT

A line interface circuit having a dialer, a line interface unit and a DC masking circuit is adapted to execute an operation in either an emergency mode or a power-on mode. The line interface circuit unifies a voice processing part and an image processing part. The line interface circuit includes a single dialer, a communication port coupled to a non-voice terminal, and a line interface control unit for receiving dial information from a key matrix input at the non-voice terminal via the communication port in a power-on state of the non-voice terminal. The line interface control unit derives DC power converted from AC power supplied form a desired AC power supply, and transferring the dial information to the dialer. A method for controlling the line interface circuit is also provided to selectively couple a non-voice terminal and a voice terminal both equipped in a telephone communication system to a telephone line via the line interface circuit.

16 Claims, 10 Drawing Sheets

| X MSB | X | d5 | d4 | d2 | d2 | d1 | 1 LSB |
|---|---|---|---|---|---|---|---|

*Fig. 9*

| b7 MSB | b6 | b5 | b4 | b3 | b2 | b1 | b0 LSB |
|---|---|---|---|---|---|---|---|

*Fig. 10A*

| b7 MSB | b6 | b5 | 1 | 1 | 1 | 1 | 1 LSB |
|---|---|---|---|---|---|---|---|

*Fig. 10B*

TELEPHONE LINE INTERFACING CIRCUIT USED FOR BOTH VOICE AND NON-VOICE TERMINALS AND METHOD FOR CONTROLLING THE SAME

BACKGROUND OF THE INVENTION

1. Field of the Invention

The present invention relates to a telephony communication device, and, in particular, to a line interface circuit for interfacing telephone systems. The line interface enables both voice and non-voice operations at a telephone terminal with a common design. The present invention further relates to a method for controlling the line interfacing circuit.

2. Description of the Related Art

Circuits have been developed to interface communications devices with a telephone exchange system, such as a transmitter/receiver circuit in a standard telephone. Some communications devices, such as a conventional facsimile machine, are designed for both voice and non-voice communications. In one mode, the facsimile machine transmits and receives images of documents or still pictures via a telephone line. Hence, the facsimile machine includes an interfacing circuit having an image processing unit for scanning and digitizing the documents and pictures for transmission via the telephone line. In a second mode, the facsimile machine can be used for voice communications for enabling a user to orally communicate with the intended recipient of the facsimile. Hence, the facsimile machine also includes a voice processing unit, generally within the interfacing circuit, for digitizing sound.

With reference to FIG. 1 there is shown a block diagram of a conventional facsimile machine. The facsimile machine includes a central processing unit or $CPU_{FAX}$ 101 which controls the operations of the facsimile machine, such as transmitting, receiving and copying. The $CPU_{FAX}$ 101 may be provided with an associated RAM memory and stored operating program for operating the facsimile machine or $CPU_{FAX}$ 101 may be connected to an external memory 109. The CPU associated RAM may also store other data including data generated during the execution of the operating program.

An operating panel (OPE) 102 which includes a key matrix having a plurality of keys and a display unit is coupled to the $CPU_{FAX}$ 101. The key matrix includes circuitry for generating at least one signal when a user depresses one of the keys to set a desired operational mode and/or to initiate an operation. Circuitry associated with the display unit of the OPE 102 receives the at least one signal from the control unit 101 and displays an appropriate display element such as LCD(s) indicative of the operational mode or operation being executed by the facsimile machine.

The facsimile machine further includes a sensor unit 103, a scanner 104 and an image processing unit 105. The sensor unit 103 senses the placement of a document in the facsimile machine and whether there is printing paper and generates appropriate signals which are transmitted to the $CPU_{FAX}$ 101. The scanner 104 scans the document and converts the scanned image into digital data which are sent to the image processing unit 105. The image processing unit 105 processes the digital data and transmits the data via a telephone line to a receiving facsimile machine or other communication device.

A printing unit 106 is also coupled to the $CPU_{FAX}$ 101 for printing image data during the receiving or copying operations. The facsimile machine further includes a modem 107 (a non-voice terminal) for performing data communications via a telephone line. In a transmitting mode, the modem 107 modulates the digital data received from the image processing unit 105 and transmits the modulated data under the control of the $CPU_{FAX}$ 101. In a receiving mode, the modem 107 demodulates coded image signals received via the telephone line to re-create the original document data.

A line interface unit (LIU) 108 is coupled between the modem 107 and the telephone line. The LIU 108 establishes a channel between the modem 107 and the telephone line to facilitate: interfacing the telephone line with the modem 107; interfacing the telephone line with a telephone handset; processing of a ring signal received from an exchange system; and telephone dialing operations. The LIU 108 has a tip terminal T and a ring terminal R which are coupled to the telephone line. The above-mentioned functions of the LIU 108 will now be described with reference to FIG. 2.

First, the function of interfacing the telephone line with the modem 107 will be described.

In facsimile data communications, a non-voice path (NVP) is selected by switch unit 110 in response to a switch control signal S1 received from the $CPU_{FAX}$ 101 to trip a switch therein to couple the tip terminal T and ring terminal R to the modem 107 via a first dialer 120 and a first LIU 130 to establish a DC loop. The first LIU 130 serves to transmit signals such as modulated facsimile signals and dual tone multi-frequency (DTMF) dial signals generated from the modem 107 to the telephone line. The first dialer 120 generates the dial pulses.

In addition to selecting a non-voice path, the switch unit 110 can select a voice path (VP) along a second LIU 135, a speech network 150 and a handset 180 to perform a telephone hook switching function. This is accomplished by transmitting a control signal S2 from the $CPU_{FAX}$ 101 to the first dialer 120 to cut-off the DC loop and generate dial pulses. The first LIU 130 serves to keep an AC impedance matching with telephone exchange system EXH by carrying out primary/secondary separating functions, an AC signal coupling function, and a DC masking function.

The function of interfacing the telephone line with the telephone handset 180 to perform voice communications will now be described with respect to the $CPU_{FAX}$ 101 being in a power-on state and in a power-off state. When the user lifts the handset 180 the facsimile is thrown into a DTMF dial mode and the $CPU_{FAX}$ 101 is in the power-on state. In the DTMF dial mode, the speech network 150 can perform various functions such as an inter-conversion between speech signals and electrical signals, inter-conversion between two-wire signals and four-wire signals, AC impedance matching, a DC masking, and a speech transmitting and receiving function. The power-on state is sensed by a hook detector (not shown) which sends a hook-off status signal to the $CPU_{FAX}$ 101 to thereby prepare the modem 107 for a dialing operation via depression of keys on key matrix 250. If the user does not lift the handset, the facsimile is in a dial pulse (DP) dial mode and the $CPU_{FAX}$ 101 controls the first dialer 120 to ready itself for a dialing operation.

In the power-off status of the $CPU_{FAX}$ 101, i.e., when the facsimile machine is in a non-operational mode or emergency mode, a separate hook switch (not shown) connected to the switch unit 110 is mechanically tripped upon lifting of the handset 180 to couple the telephone line to the speech network 150. A bridge diode may be utilized to supply regulated electric power to the telephone line despite variations in the polarity of the electric power.

The dialing operation is initiated by switching the second dialer 170 to the DTMF/DP dial mode by lifting the handset 180 as noted above. The second dialer 170 is supplied with electric power from the speech network 150 for converting dial data received from the key matrix 250 in a form corresponding to the DTMF/DP dial mode. The converted data from the second dialer 170 is then sent to the speech network 150 for the dialing operation.

The LIU 108 of FIG. 2 is uneconomical and inefficient in terms of its circuit configuration since it has an overlapping design. The LIU 108 uses two dialers 120 and 170, two line interface units 130 and 135, and overlapping DC masking circuits. In addition, there are problems regarding the various functions of the LIU 108.

First, there is a problem regarding the function of interfacing the telephone line with the modem 107 and the telephone handset 180. Since the modem 107 and the speech network 150 have AC impedance and DC masking circuits, respectively, the modem 107 exhibits AC impedance and the speech network 150 exhibits direct current resistance (DCR). Therefore, switching noise may be generated on the telephone line when switching occurs between the telephone handset 180 and the facsimile machine by switch unit 110 to switch from voice to non-voice communications.

Second, there is a problem regarding the dialing operation. Since one dialer 120 is used for the modem path and another dialer 170 for the telephone path, the dialers 120 and 170 are not appropriately designed to be able to execute both voice and non-voice communications. Therefore, one has to switch between dialers to change from voice to non-voice communications and vice versa.

Third, there is a problem with the LIU 108 in recognizing a confirm tone generated during the execution of dialing operation in the power-on mode for a voice communication if the switch unit is switched to the non-voice path. As a result, the user cannot initiate a dialing operation for a voice communication when switch unit 110 is switched to the non-voice path because one cannot hear dial tones through the handset 180. The switch unit 110, which operates under the control of the $CPU_{FAX}$ 101, connects the telephone line to the telephone handset 180 only for a short period after the generation of a digit is ended, and before the next digit is generated. Accordingly, the speech network 150 does not operate throughout the dialing operation. As a result, an abnormal dialing operation occurs because the handset 180 intermittently outputs a dial tone whenever the switch unit 110 switches back to the speech network 150.

Further, when a dialing operation is carried out for a voice communication using the handset 180 in a power-on state of the $CPU_{FAX}$ 101, the second dialer 170 associated with the telephone handset 180 cannot be used for a non-voice communication.

Fourth, the last number redial feature may not work properly in the LIU 108 of FIG. 2, especially when the facsimile machine is in the emergency mode. The information about the last number dialed in the ON state is stored in the memory of the $CPU_{FAX}$ 101 while the last number dialed in the OFF state is stored in the second dialer 170. In this regard, LNR information stored in the $CPU_{FAX}$ 101 and LNR information stored in the second dialer 170 may differ. Therefore, the user may dial an unintended number when executing the LNR feature.

SUMMARY OF THE INVENTION

It is therefore an object of the present invention to provide a line interface circuit which includes a circuit configuration having a dialer, a line interface unit (LSU) and a DC masking circuit adapted to execute a dialing operation without switching between two different dialers and two different line interface units, one for voice communications and one for non-voice communications. The present invention also provides a method for controlling the line interface circuit.

It is another object of the present invention to provide a line interface circuit capable of allowing a user to continuously hear dial confirmation tones generated during a voice dialing operation.

Further, it is an object of the present invention to provide a line interface circuit which includes a single unit for storing LNR information, thereby preventing the dialing of an unintended number.

In one embodiment of the present invention, a line interface circuit for interfacing a voice terminal and a non-voice terminal with a telephone exchange via a telephone line, comprises: a single dialer for facilitating communication between the voice terminal and non-voice terminal with said telephone exchange; a communication port coupled to the non-voice terminal; and line interface control unit for receiving dial information from a key matrix input at the non-voice terminal via the communication port in a power-on state, for deriving power during said power-on state from said telephone exchange, for transferring the dial information to the dialer, for directly receiving dial information from the key matrix in a power-off state of the non-voice terminal, and for transferring the dial information to the dialer.

In a second embodiment of the present invention, a method for controlling a line interface circuit used to interface a telephone exchange system with a non-voice terminal and a voice terminal through a telephone line, including the steps of: sensing a hook-off status of a handset equipped to the voice terminal; transmitting a signal indicative of the sensed hook-off status to a main control unit from a line interface control unit of the line interface circuit; checking whether a response to the hook-off status signal is generated by the main control unit within a predetermined time from the time when the hook-off status signal is transmitted; setting an operational mode if it is determined that the response is generated within the predetermined time and coupling the voice terminal to said telephone line upon setting said operation mode; and checking receipt of dial information via the voice path.

BRIEF DESCRIPTION OF THE DRAWINGS

These and various features and advantages of the present invention will be readily understood with reference to the following detailed description taken in conjunction with the accompanying drawings, in which:

FIG. 9 is a diagram illustrating an illustrative message format as transferred from the control unit of the facsimile machine to the control unit of the LIU;

FIGS. 10A and 10B are diagrams showing illustrative message formats as transferred from the control unit of the LIU to the control unit of the facsimile machine.

DETAILED DESCRIPTION OF THE PREFERRED EMBODIMENTS

Figure 1:
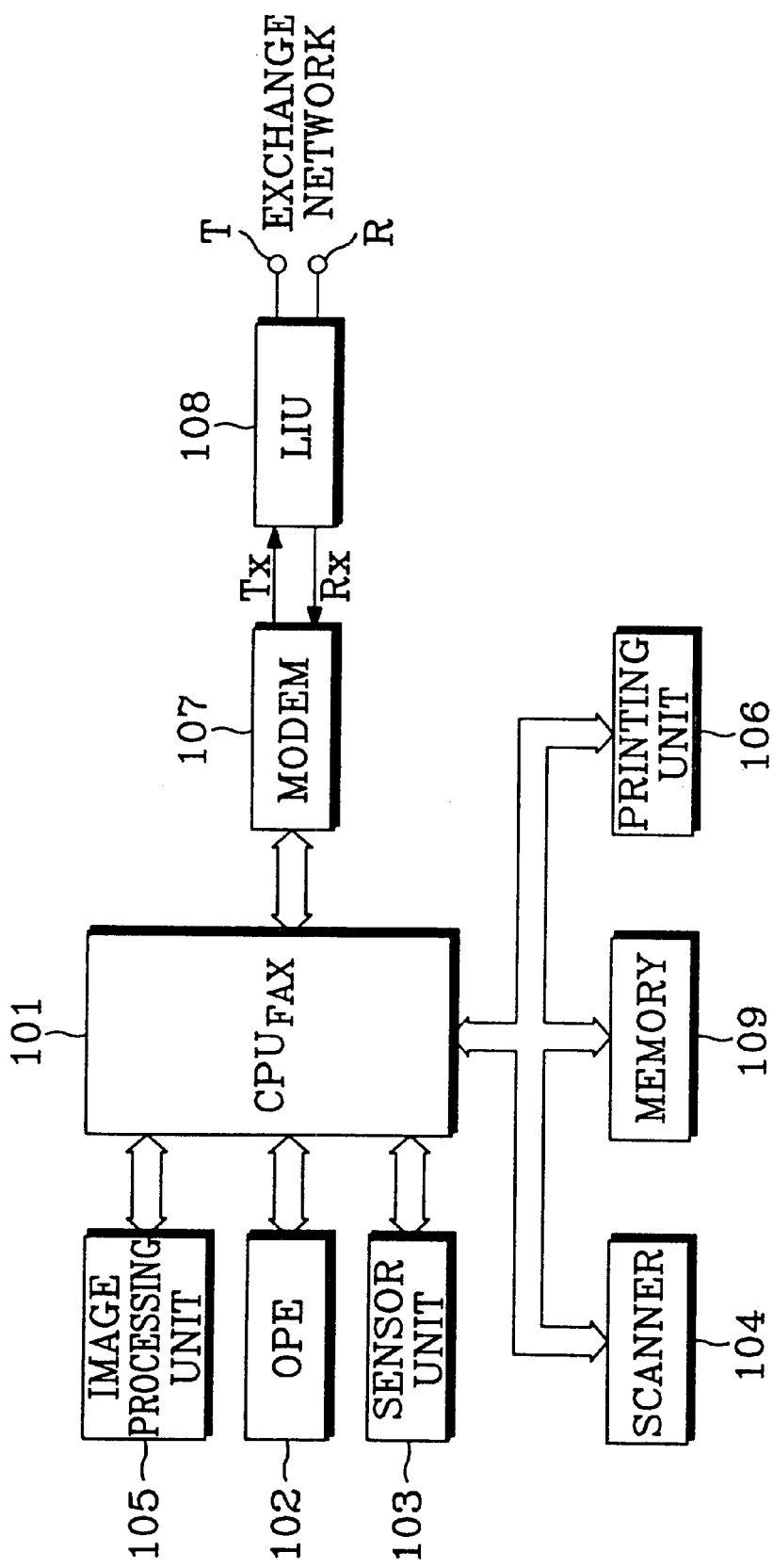
FIG. 1 is a block diagram schematically illustrating the circuit configuration of a conventional facsimile machine.
Figure 2:
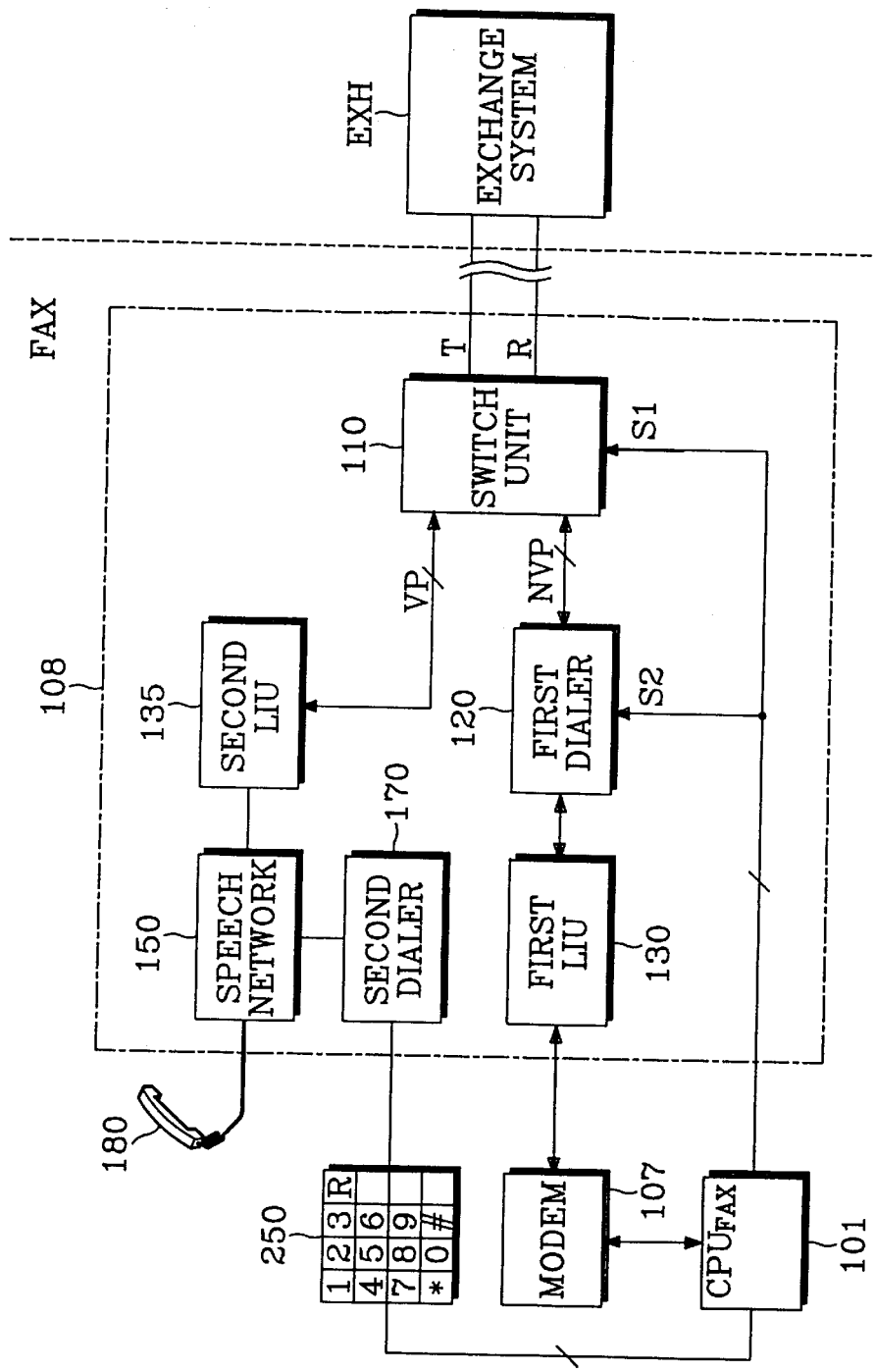
FIG. 2 is a block diagram illustrating the circuit configuration of an LIU of the conventional facsimile machine.

Preferred embodiments of the telephone line interfacing circuit will now be described with reference to the drawings, in which like reference numerals designate identical or corresponding elements in each of the several views. It is noted that different terms may be used in the field to refer to objects of the present invention than the terms used herein.

Figure 3:
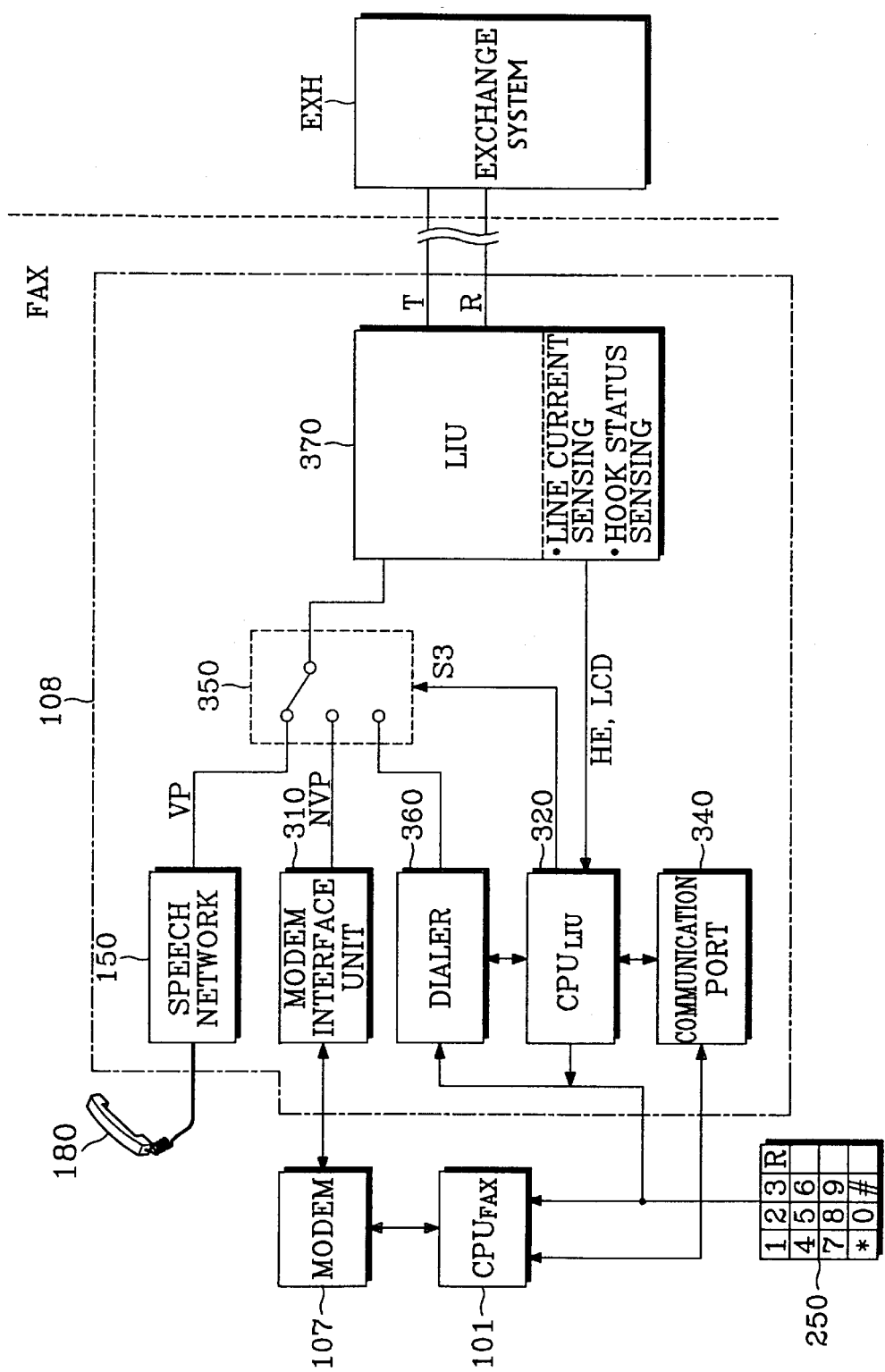
FIG. 3 is a block diagram of an LIU according to the present invention.

A line interface circuit in accordance with the present invention is illustrated by FIG. 3. In FIG. 3, block 108 denotes the part of a facsimile machine corresponding to the LIU which interfaces an exchange system EXH with a $CPU_{FAX}$ 101, a modem 107, and a telephone handset 180. The LIU 108 uses DC power supplied from the exchange system EXH via line interface unit 370. The LIU 108 may be incorporated onto a chip as an integrated circuit.

The LIU 108 includes a central processing unit or a digital logic circuit having functions similar to the central processing unit. The central processing unit is referred herein as "a $CPU_{LIU}$" and designated by numeral 320. The $CPU_{LIU}$ 320 exchanges commands and status information between the exchange system EXH and the $CPU_{FAX}$ 101 within the facsimile machine via a communication port 340 for controlling line interfacing and telephone functions. A universal a synchronous receiver transmitter (UART) may be used for the communication port 340.

The $CPU_{LIU}$ 320 receives dial digit information from the $CPU_{FAX}$ 101 via the communication port 340 and transfers the dial digit information to a dialer 360 to execute a dialing operation irrespective of the ON/OFF status of the main power. During the execution of the dialing operation, dial tones are generated and transferred by the $CPU_{FAX}$ 101 to a voice path in the LIU 108 in order for the user to confirm the dialing operation.

The dial digit information is received by the $CPU_{FAX}$ 101 from a key matrix 250. The user depresses optional keys on the key matrix 250 and intrinsic key code values corresponding to the depressed keys are transmitted to the dialer 360 of the LIU 108 or to the $CPU_{FAX}$ 101 depending on whether the dialer 360 or $CPU_{FAX}$ 101 is designated by the $CPU_{LIU}$ 320. For example, in an emergency mode, the $CPU_{LIU}$ 320 generates a key input enable signal so the key code values are transmitted to the dialer 360. In a power-on mode, the $CPU_{LIU}$ 320 generates a key input disable signal so the key code values are transmitted to the $CPU_{FAX}$ 101.

In addition, the $CPU_{LIU}$ 320 stores dial information regarding the last number dialed in the emergency mode and transfers the stored dial information to the $CPU_{FAX}$ 101 via the communication port 340. The previous number dialed is sent from the $CPU_{LIU}$ 320 back to the $CPU_{FAX}$ 101 via the communication port 340 and to the dialer if there is a redial key input from the user for performing a LNR function.

As apparent from the above description, the voice processing portion and image processing portion of the facsimile machine commonly use certain circuits, such as the dialer 360 and line interface unit 370. Accordingly, unlike the prior art, line noise is not generated during switching between the telephone and facsimile machine, since the same dialer is used for voice and non-voice communications.

Figure 4:
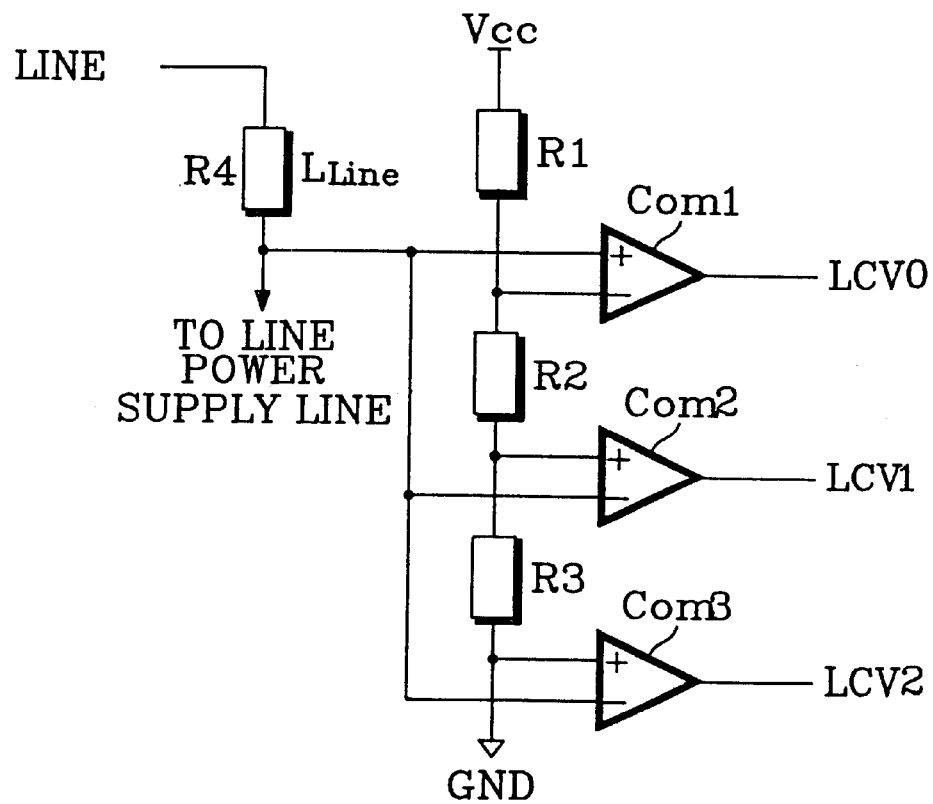
FIG. 4 is a schematic illustrating a line current detecting circuit which can be equipped in the LIU of FIG. 3.

FIG. 4 illustrates a line current detecting circuit which can be equipped to the line interface unit 370. The line current detecting circuit includes resistors R1 to R4 and comparators COM1 to COM3. The outputs LCV0 to LCV2 from the three comparators COM1 to COM3 are sent to the $CPU_{LIU}$ 320. Therefore, one can check whether there is a variation in the amount of current flowing through the line by checking whether there is a variation in the outputs LCV0 to LCV2. The accuracy of the current sensing circuit of FIG. 4 can be improved by increasing the number of comparators and resistors.

The amount of current flowing through the line is reduced when a terminal is coupled to the line or parallel telephones share the same line. The line interface unit 370 senses the amount of current flowing through the line and transmits information to the $CPU_{LIU}$ 320. Based on the transmitted information, the $CPU_{LIU}$ 320 recognizes a hook-on/off status of the parallel telephones or a line cut-off state which may continue for an extended period of time during the execution of a dialing operation. In the latter case, the $CPU_{LIU}$ 320 generates a desired message and transmits the message to the $CPU_{FAX}$ 101 via the communication port 340 to inform the user that a dialing operation is taking place.

Figure 5:
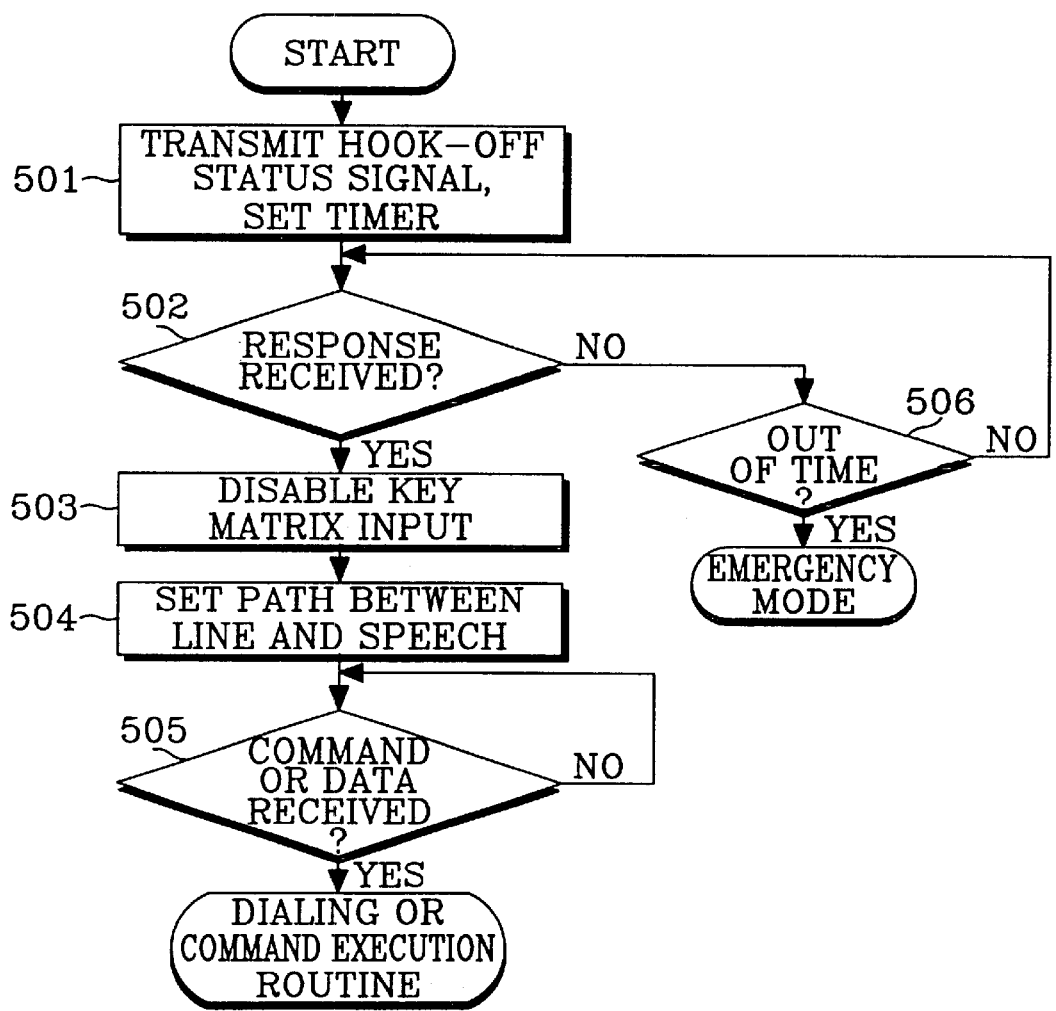
FIG. 5 is a flow chart illustrating a line interfacing procedure in a power-on mode in accordance with the present invention.
Figure 6:
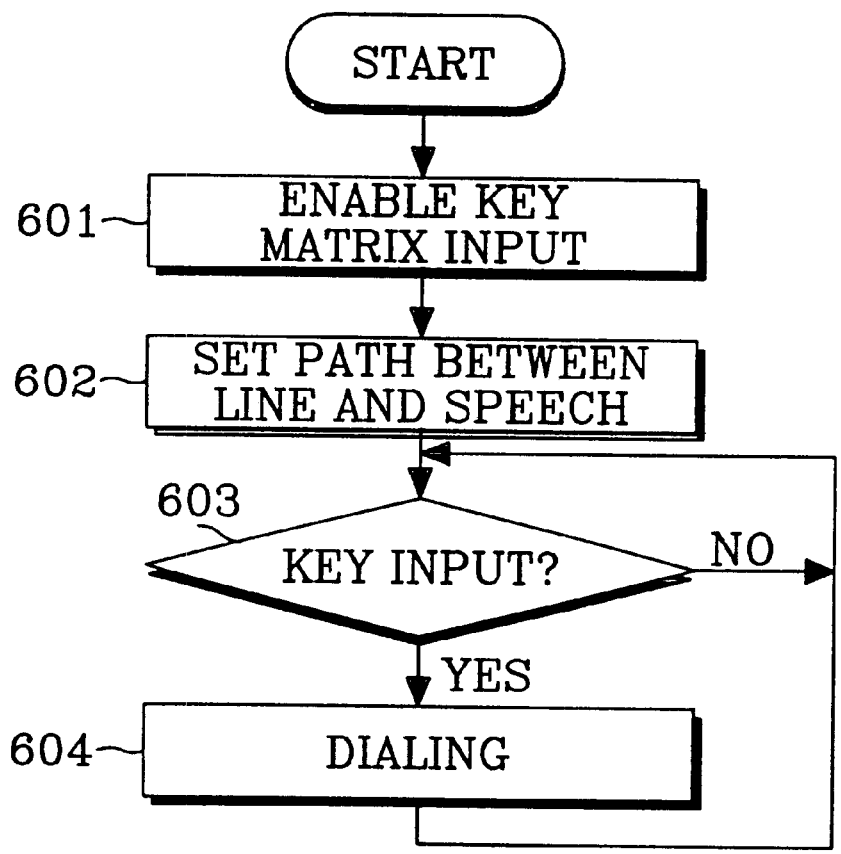
FIG. 6 is a flow chart illustrating a line interfacing procedure in an emergency mode in accordance with the present invention.

FIGS. 5 and 6 are flow charts depicting illustrative line interfacing operations in accordance with the present invention. FIG. 5 depicts line interfacing in the power-on mode and FIG. 6 depicts line interfacing in the emergency mode.

The line interfacing operation according to the present invention will now be described in conjunction with the above-mentioned configuration. When the user lifts the handset 180, the LIU 108 is powered by line current supplied from the exchange system EXH causing the handset 180 to be in the hook-off state. The $CPU_{LIU}$ 320 then checks whether or not the $CPU_{FAX}$ 101 is the power-on state, i.e., whether the main power of the facsimile machine is supplied (ON). This checking may be accomplished using various methods. In accordance with one method, the $CPU_{LIU}$ 320 transfers a command to the $CPU_{FAX}$ 101 via the communication port 340 and for a predetermined time waits for a response from the $CPU_{FAX}$ 101. When a response is received made from the $CPU_{FAX}$ 101 within the predetermined time, the $CPU_{LIU}$ 320 recognizes the $CPU_{FAX}$ 101 to be in the power-on state. If a response is not received, the $CPU_{LIU}$ 320 assumes the $CPU_{FAX}$ 101 to be in the power-off state or the emergency mode.

In accordance with another method, a hardware port between the $CPU_{FAX\ 101}$ and LIU 108 is used to determine the power state of the $CPU_{FAX}$ 101. The $CPU_{LIU}$ 320 checks the state of this port to determine the power-on/off state of the $CPU_{FAX}$ 101. In accordance with another method, the $CPU_{FAX}$ 101 periodically transfers a command to the $CPU_{LIU}$ 320 of the LIU 108 via the communication port 340. When the $CPU_{FAX}$ 101 receives a response from the $CPU_{LIU}$ 320, the $CPU_{FAX}$ 101 sends to the $CPU_{LIU}$ 320 a command to initiate execution of a normal operation.

With reference to FIG. 5, at step 501 the $CPU_{LIU}$ 320 transmits a hookoff status signal to the $CPU_{FAX}$ 101 via the communication port 340. Simultaneously, the $CPU_{LIU}$ 320 initiates a timer equipped therein. The timer is set to check whether $CPU_{FAX}$ 101 will generate a response to the hook-off status signal within a predetermined time. If there is no response from the $CPU_{FAX}$ 101 within the predetermined time, the procedure advances to step 506. Step 506 checks whether the timer has clocked more than the predetermined time. If it is determined at step 506 that the timer has clocked more than the predetermined time, an emergency mode control routine is executed.

However, if at step 506 it is determined that the timer has not clocked more than the predetermined time, than the procedure returns to step 502. At step 502, the $CPU_{LIU}$ 320 waits for a response from the $CPU_{FAX}$ 101. If there is a response from the $CPU_{FAX}$ 101, the $CPU_{LIU}$ 320 determines that the $CPU_{FAX}$ 101 is in the power-on mode and executes step 503. At step 503, the $CPU_{LIU}$ 320 generates a key input disable signal to prevent a key code value from being received from the key matrix 250. Then the $CPU_{LIU}$ 320 records a code indicative of this disable state in a key register. Therefore, the $CPU_{LIU}$ 320 of the LIU 108 can execute a control to carry out a dialing operation only for dial information transferred from the $CPU_{FAX}$ 101 via the communication port 340 while ignoring the key code value generated from the key matrix 250 by reading the disable code recorded in the key register.

After disabling the input from the key matrix 250, the procedure advances to step 504. At step 504, the handset 180 is connected to the telephone line path in order for a dial tone or signal from the exchange system EXH to be heard through the handset 180. Referring to FIG. 3, this connection is accomplished by sending a switch control signal S3 from the $CPU_{LIU}$ 320 to the switch unit 350 instructing a connection with the voice path (VP). Upon receiving the switch control signal S3, the switch unit 350 connects the handset 180 to the telephone via the speech network 150. As a result, the user can hear the confirm tones generated during the dialing operation.

The above procedure is an example for explaining the procedure of checking whether or not the $CPU_{FAX}$ 101 is in its power-on state under the condition that the LIU 108 is powered on, and then executing an initial operation based on the results of the checking.

Referring once again to FIG. 5, at step 505 the procedure checks whether the $CPU_{LIU}$ 320 received a desired command or data from the $CPU_{FAX}$ 101 via the transmission port 340 after setting the LIU 108 to the power-on mode. If there is a command or data received from the $CPU_{LIU}$ 320, the procedure advances to a routine for executing a procedure associated with the received command or data. If a command or data is not received, the $CPU_{LIU}$ 320 will wait until the desired command or data is received.

When the $CPU_{LIU}$ 320 receives data indicative of dial information, the $CPU_{LIU}$ 320 sends signals for controlling the dialer 360 in order to execute a dialing operation. Where the dialing mode is set to the DTMF mode, the dialer 360 generates a DTMF signal by composing high and low group signals of dial digits and then transmits the DTMF signal to the $CPU_{LIU}$ 320.

FIG. 6 shows a dialing operation in the emergency mode, i.e., when the $CPU_{FAX}$ 101 is in the power-off state. When the LIU 108 determines that the $CPU_{FAX}$ 101 is in its power-off state, i.e., in the emergency mode, the $CPU_{LIU}$ 320 receives key code values from the key matrix 250 for initiating the dialing operation at step 601. A key input enable signal is generated by the $CPU_{LIU}$ 320 which is recorded in the internal key register. At step 602, the handset 180 is connected to the telephone line via the voice path (VP) in order for the user to hear the dialing tones generated during the dialing operation. At step 603, the dial numbers pressed on the key matrix 250 to execute the dialing operation are determined by known methods of scanning and decoding. The decoded key input is then sent to the $CPU_{LIU}$ 320 as dial information. At step 604, the $CPU_{LIU}$ 320 sends the dial information to the tip and ring terminals T and R of the telephone line by passing the dial information through the switch unit 350 via the dialer 360 for the terminals to transmit DTMF dial tones or dial pulses.

As shown in FIG. 5, the LIU 108 waits for a command or dial information from the $CPU_{FAX}$ 101 at step 505 after completing the initialization in the power-on mode. Since in the power-on mode, the input transferred to the LIU 108 has been disabled, the key code values from the key matrix 250 are recognized only by the $CPU_{FAX}$ 101. The recognized key code values are then transferred from the $CPU_{FAX}$ 101 to the $CPU_{LIU}$ 320 via the communication port 340. This transferring process will now be described in detail with reference to FIG. 7.

Figure 7:
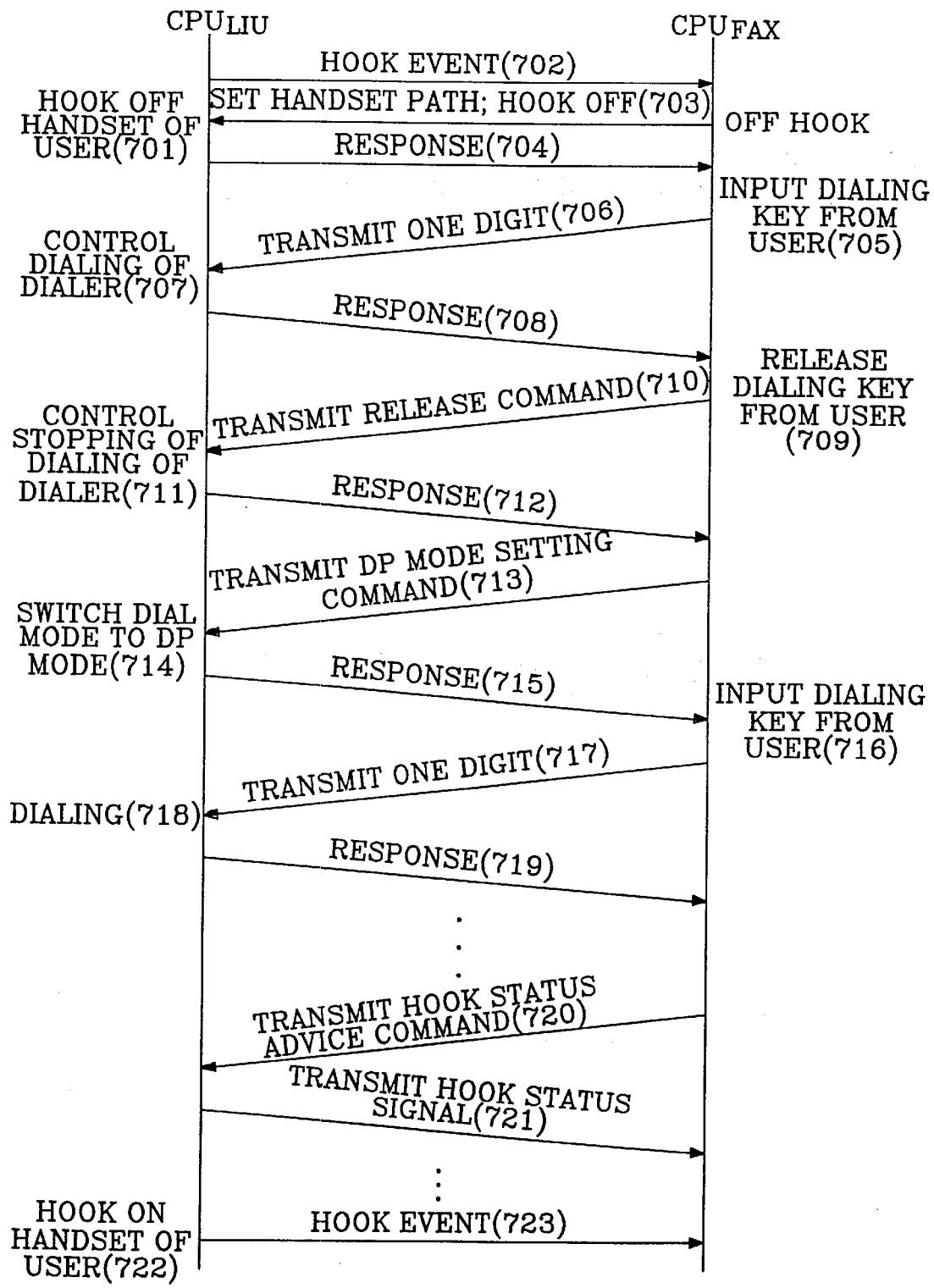
FIG. 7 is a diagram illustrating protocols between a control unit of the LIU and a control unit of a facsimile machine in accordance with the present invention.

FIG. 7 shows commands associated with data transmitting/receiving protocols for exchanging data between the $CPU_{LIU}$ 320 and $CPU_{FAX}$ 101 in the power-on mode. When a hook event signal indicative of the hook-off state of the handset 180 is generated by a manipulation of the user at step 701, the $CPU_{LIU}$ 320 informs the $CPU_{FAX}$ 101 of the generation of the hook event signal at step 702. In response to the hook event signal, the $CPU_{FAX}$ 101 transmits a handset path setting command, namely, a voice path command, to the $CPU_{LIU}$ 320 at step 703. The $CPU_{LIU}$ 320 then transmits a desired response to the voice path command to the $CPU_{FAX}$ 101 at step 704. When the user presses the keys of the key matrix 250 to generate key inputs for a dialing operation at step 705, the key inputs are sensed by the $CPU_{FAX}$ 101. Hence, at step 706, dial information is sent to the $CPU_{LIU}$ 320.

In response to the dial information, the $CPU_{LIU}$ 320 controls dialing of dialer 360 at step 707 for the dialer 360 to start the dialing operation. The procedure then advances to step 708 where a response to the received dial information is sent to the $CPU_{FAX}$ 101. Upon receiving the response, the $CPU_{FAX}$ 101 continuously transmits the corresponding digit information to the $CPU_{LIU}$ 320.

At step 709, a dial key release signal is generated upon the user not pressing any keys for a predetermined time. When the $CPU_{FAX}$ 101 senses the dial key release input, the procedure advances to step 710 where the $CPU_{FAX}$ 101 sends a key release command to the $CPU_{LIU}$ 320. In accordance with the key release command, the $CPU_{LIU}$ 320 stops the dialer 360 from further dialing at step 711. The $CPU_{LIU}$ 320 then checks to determine whether the tone transmission time i.e., the time elapsed from the time the key release command is received equals the predetermined tone transmission time. If the tone transmission time is shorter than the predetermined tone transmission time, then generation of the dial tone is continued until the tone transmission time equals the predetermined tone transmission time. Once the tone transmission time equals the predetermined tone transmission time, the generation of the dial tone is stopped. If it is determined that the tone transmission time is longer than the predetermined tone transmission time, the generation of the dial tone is stopped instantaneously. The $CPU_{LIU}$ 320 then sends a response to the $CPU_{FAX}$ 101 at step 712.

When the dialing operation is switched from the DTMF mode to the DP mode or when the dialing operation is executed in the DP mode, the $CPU_{FAX}$ 101 sends a "DP mode setting" command to the $CPU_{LIU}$ 320 at step 713. In response to the DP mode setting command, the $CPU_{LIU}$ 320 controls its internal register to set the dialing mode to the DP mode at step 714. At step 715, the $CPU_{LIU}$ 320 sends a response to the $CPU_{FAX}$ 101. When the $CPU_{FAX}$ 101 subsequently receives a key code value from the key matrix 250 at step 716, the procedure advances to step 717. At step 717, the $CPU_{FAX}$ 101 transfers dial information to the $CPU_{LIU}$ 320. In response to the dial information, the $CPU_{LIU}$ 320 checks its internal register to identify the current dialing mode. Based on the identification, the $CPU_{LIU}$ 320 controls the dialer 360 at step 718 in order for the dialer 360 to execute a dialing operation for the dial digit in the DP mode. After the completion of the dialing operation, the procedure advances to step 719 where the $CPU_{LIU}$ 320 sends a response to the $CPU_{FAX}$ 101. After receiving this response, the $CPU_{FAX}$ 101 determines whether there is another dial number. When there is another dial number, the $CPU_{FAX}$ 101 re-executes the above operation to transfer the dial digit until there are no more dial digits.

When data or a command is not exchanged between the $CPU_{LIU}$ 320 and $CPU_{FAX}$ 101 during the execution of the dialing operation or even after a response is made from a counterpart telephone, assuming that the dialing operation has been completed, the $CPU_{FAX}$ 101 periodically transmits a "hook status advice" command to the $CPU_{LIU}$ 320 at step 720. In response to the hook status advice command, the $CPU_{LIU}$ 320 generates a responding signal, namely, a hook status signal at step 721. However, if the $CPU_{FAX}$ 101 does not transmit the hook status advice command for a predetermined time at step 720, the $CPU_{LIU}$ 320 determines that the $CPU_{FAX}$ 101 is in the power-off state. In this case, the $CPU_{LIU}$ 320 sets the current operation mode to the emergency mode and a control for the emergency mode is initiated.

When a hook event signal indicative of a hook-on status of the handset is generated at step 722 by the user placing the handset 180 on a handset cradle, the signal is sensed by the $CPU_{LIU}$ 320 which, in turn, informs the $CPU_{FAX}$ 101 at step 723.

Figure 8:
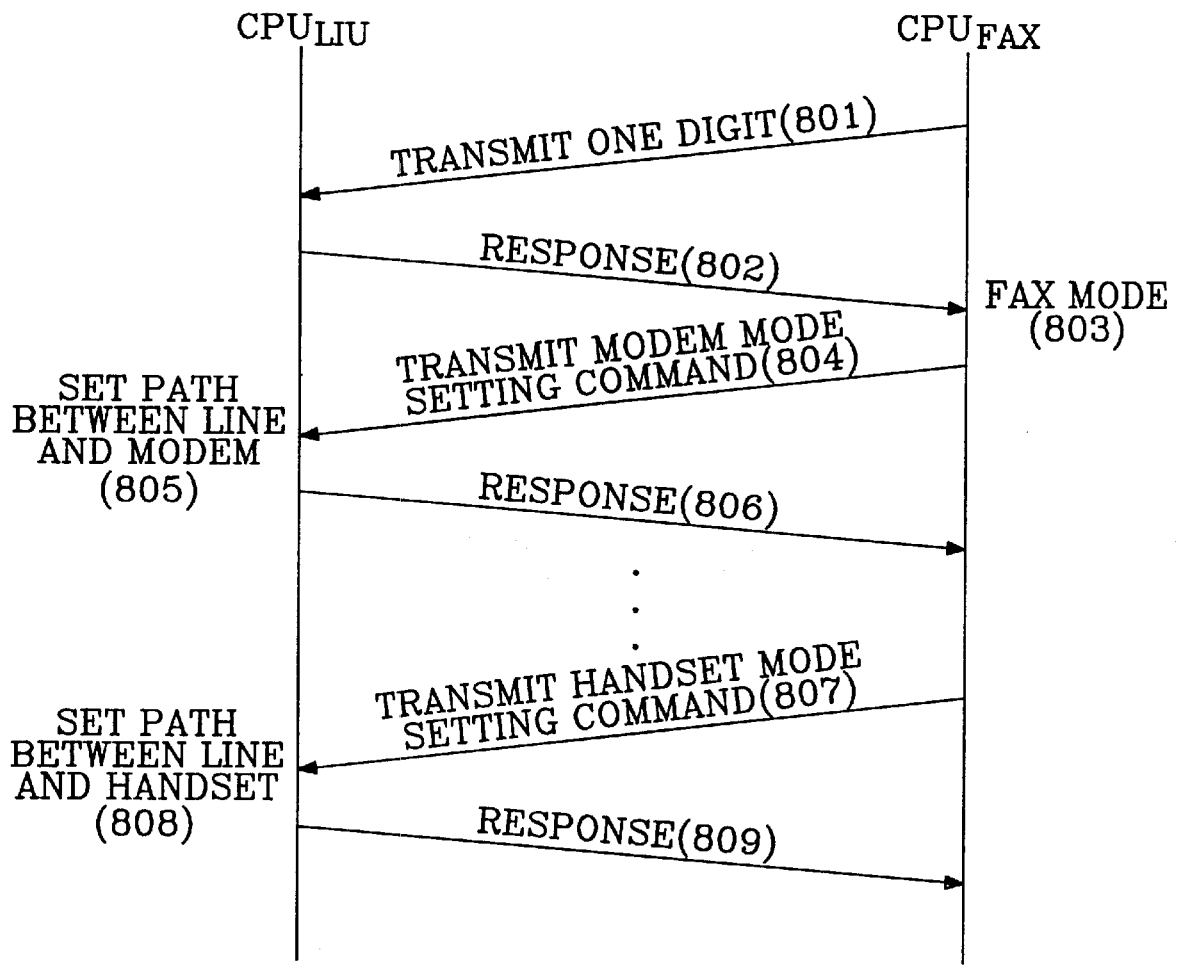
FIG. 8 is a diagram illustrating the procedure of switching internal paths of the LIU in accordance with commands received from the control unit of the facsimile machine.

FIG. 8 shows the procedure of switching the internal paths of the LIU 108 in accordance with different commands generated by the $CPU_{FAX}$ 101. A dialing operation is first initiated at steps 801 and 802 similarly to the dialing operation depicted by FIG. 7. When the current operational mode is switched to the facsimile mode for a facsimile transmission at step 803 during the execution of the dialing operation, the mode switching is sensed by the $CPU_{FAX}$ 101. The $CPU_{FAX}$ 101 thus transfers a "modem mode setting" message to the $CPU_{LIU}$ 320 at step 804. The $CPU_{LIU}$ 320 then switches the current internal path to a desired internal path at step 805 in accordance with the message received from the $CPU_{LIU}$ 320 at step 805. The switching is achieved by the generation of a switch control signal S1 in a first state, for example, a logic high level. Upon receiving the switch control signal S1, the switch unit 350 connects the telephone line terminals T and R, to the modem 107 via the non-voice path (NVP).

Referring to FIG. 8 the $CPU_{LIU}$ 320 transmits a response to the $CPU_{FAX}$ 101 at step 806 after switching its internal path. Subsequently, it may be required to switch the current operational mode to the telephone mode due to the user's desire for a voice conversation or for other reasons. If this is the case, then the $CPU_{FAX}$ 101 at step 807 sends a "handset mode setting" command to the $CPU_{LIU}$ 320 at step 808. FIG. 9 illustrates a format message of the type transferred from the $CPU_{FAX}$ 101 to the $CPU_{LIU}$ 320. The message format may be associated with data or a command.

Upon receiving the mode setting command, the $CPU_{LIU}$ 320 sends a switch control signal S1 which is generated in a second state, for example, a logic low level, to the switch unit 350 at step 808. In accordance with this switch control signal S1, the switch unit 350 switches the internal path of the LIU 108 in order for the telephone line terminals T and R to be connected to the handset 180 via the voice path and speech network 150. After switching the internal path, the procedure advances to step 809 where the $CPU_{LIU}$ 320 sends a response to the $CPU_{FAX}$ 101 informing the receipt of a desired message and the execution of an operation associated with the message.

FIG. 10 illustrates message formats as transferred from the $CPU_{LIU}$ 320 to the $CPU_{FAX}$ 101. FIG. 10A is associated with a response message whereas FIG. 10B is associated with a hook event message. In the case of the response message, the lower five bits b0 to b4 are echo bits of the last received data bits d1 to d5 (see FIG. 9). These echo bits are those which have been shifted one bit to the right from the last received data bits d1 to d5. In both message formats as shown by FIGS. 10A and 10B, the upper three bits b7 to b5 indicate the hook-on/off status of a manual or electronic hook switch in the dial mode. For example, when the bit b5 is 0 in the dial mode, pulse dialing is executed, when the bit b5 is 1, tone dialing is executed.

Figure 11:
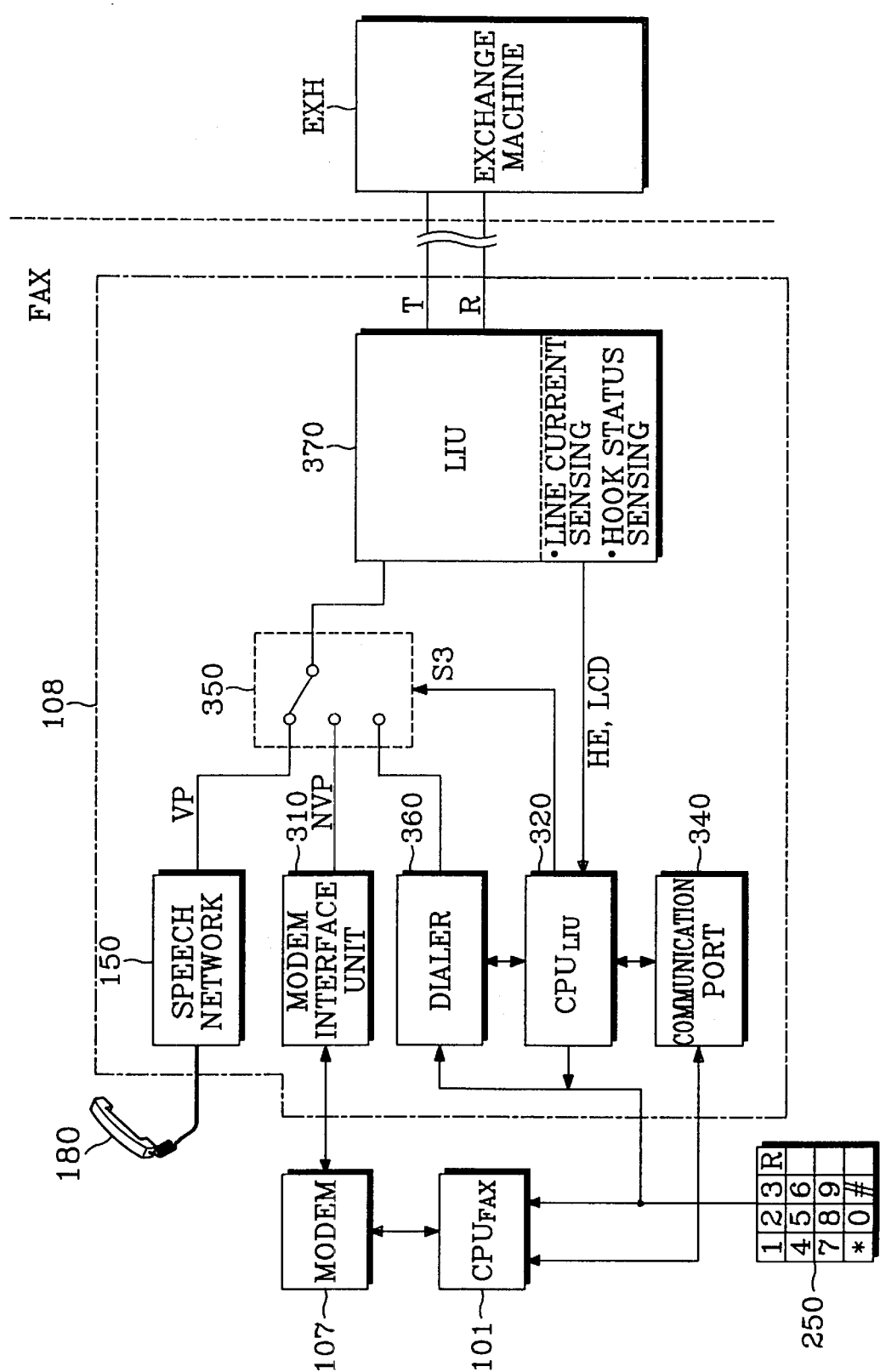
FIG. 11 is a block diagram illustrating the circuit configuration of a LIU according to another embodiment of the present invention.

FIG. 11 is a block diagram of a circuit configuration of a LIU in accordance to another embodiment of the present invention. An explanation of the operation of the $CPU_{FAX}$ 101 in the power-off state, i.e., in the emergency mode as depicted in FIG. 6 will be given hereinafter. When it is confirmed that the $CPU_{FAX}$ 101 is in the power-off state, the $CPU_{LIU}$ 320 receives key code values from the key matrix 250 to control the dialing operation at step 601. The $CPU_{LIU}$ 320 then generates a key input enable signal and records the generated key input enable signal in the internal key register. At step 602, the handset 180 is connected to the telephone line via the voice path in order for the user to hear the dialing tones generated during the dialing operation. At step 603, the dial numbers pressed are determined by scanning the key input received from the key matrix 250. The scanned key input is then decoded and sent to the $CPU_{LIU}$ 320 as dial information. At step 604, the $CPU_{LIU}$ 320 sends the dial information to the tip and ring terminals T and R of the telephone line by passing the dial information through the switch unit 350 via the dialer 360 in order for DTMF dial tones or dial pulses to be transmitted.

Although the preferred embodiments of the invention have been disclosed for illustrative purposes, those skilled in the art will appreciate that various modifications, additions and substitutions are possible, without departing from the scope and spirit of the present invention. Therefore, it is as disclosed in the accompanying claims.

What is claimed is:

1. A line interface circuit for interfacing a voice terminal and a fax terminal with a telephone exchange via a telephone line, comprising:
   a single dialer for facilitating communication between the voice terminal and fax terminal with said telephone exchange;
   a communication port coupled to the fax terminal;
   a line interface control unit for receiving dial information from a key matrix input at the fax terminal via the communication port in a power-on state, for deriving power during said power-on state from said telephone exchange, for transferring the dial information to the dialer, for directly receiving dial information from the key matrix in a power-off state of the fax terminal, and for transferring the dial information to the dialer, and a fax central processing unit for generating and transferring at least one of commands and status information to the line interface control unit;

wherein the line interface control unit receives the commends or status information and generates in response to the received commands or status information switching control signals for switching between one of a voice path, a non-voice path, and a dialing path during the execution of a dialing operation to confirm the dialing operation to a user by transferring dial tone to the voice path.

2. The line interface circuit according to claim 1, wherein the non-voice terminal is a modem having means for converting data to be transmitted into analog form and for converting data received via the telephone exchange system into digital form.

3. The line interface circuit according to claim 1, wherein the non-voice terminal is a modem having modulating and demodulating means for transmitting and receiving image data via the telephone exchange system.

4. A line interface circuit for a telephone communication system having a voice terminal, a fax terminal, and a control unit for the fax terminal, comprising:

a line interface unit coupled to a telephone exchange via at least one telephone line;

a switch unit coupled to the line interface unit and selectively coupled to one of a speech network, a modem interface unit, and a dialer, said switch unit directly coupling said dialer to initiate a call and then selectively coupling the at least one telephone line to one of the speech network via a voice path and the modem interface unit via a non-voice path;

a line interface control unit coupled to the fax terminal for transferring dial information received from the fax terminal directly to said dialer and for generating at least one control signal for controlling switching of the switch unit between the speech network and the modem interface unit; and a fax central processing unit for generating and transferring at least one of commands and status information to the line interface control unit;

wherein the line interface control unit receives the commands or status information and generates in response to the received commands or status information the control signals during the execution of a dialing operation to confirm the dialing operation to a user by transferring dial tone to the voice path.

5. The line interface circuit according to claim 4, wherein the non-voice terminal is a modem having modulating and demodulating means for transmitting and receiving image data via the telephone exchange system.

6. The line interface circuit according to claim 4, wherein the non-voice terminal includes means for converting data to be transmitted into analog form and for converting data received into digital form.

7. The line interface circuit according to claim 4, further including a dialer adapted to dial optional digits.

8. The line interface circuit according to claim 7, wherein the dialer Is further adapted to generate a multi-frequency dual tone or dial pulses upon receiving dial information from the line interface unit.

9. The line interface circuit according to claim 4, further comprising hook status sensing means for sensing a hook-off status of a voice terminal and transmitting at least one signal to the line interface control unit, wherein said line interface control unit transmits at least one switch control signal to the switch unit to couple the line interface control unit to the voice path.

10. The line interface circuit according to claim 4, further comprising line current sensing means for detecting a variation in the amount of current flowing through at least one telephone line and transmitting at least one signal to the line interface control unit wherein said line interface control unit transmits at least one switch control signal to the switch unit.

11. The line interface circuit in accordance to claim 4, wherein the line interface circuit is powered by DC power supplied from the telephone exchange.

12. A method for controlling a line interface circuit used to interface a telephone exchange system with a fax and a voice terminal comprising the steps of:

sensing an off-hook status of a handset equipped to the voice terminal;

transmitting a signal indicative of the sensed off-hook status to a main control unit from a line interface control unit of the line interface circuit;

checking whether a response to the off-hook status is generated by the main control unit within a predetermined time from the time when the off-hook status signal is transmitted, indicating a power-on mode;

setting an operational mode to a first mode if it is determined that the response is generated within the predetermined time and setting a communication path between the main control unit and the line interface control unit; and setting the operational mode to a second mode if it is determined that the response is not generated within the predetermined time, indicating a power-off mode, for said line interface control unit to receive dial information from input means for performing a dialing operation, wherein during execution of said dialing operation a fax central processing unit generates and transfers at least one of commands and status information to the line interface control unit, and the line interface control unit receives the commands or status information and generates in response to the received commands or status information switching control signals for switching between one of a voice path, a non-voice path, and a dialing path to confirm the dialing operation to a user by transferring dial tone to the voice path.

13. The method according to claim 12, wherein the step of setting the first operational mode includes the step of transmitting a key input disable signal from the line interface control unit to the input means to prevent dialing information from being transmitted from the input means to the line interface circuit.

14. The method according to claim 12, wherein the step of setting the second operational mode includes the step of transmitting a key input enable signal from the line interface control unit to the input means to enable dialing information to be transmitted from the input means to the line interface circuit.

15. A line interface circuit for interfacing both a voice terminal and a fax terminal with an exchange system via a telephone line, the line interface circuit being activated by power derived from the exchange system, comprising:

a dialer, said dialer being responsive to the voice terminal and fax terminal and providing a dial signal to the telephone line, said dialer receiving dial information from a key matrix in a power-off state of said fax terminal;

a communication port coupled to the fax terminal;

a line interface control unit for receiving dial information from said key matrix input at the fax terminal via the communication port in a power-on state of the fax terminal, and for transferring the dial information to the dialer, a switch unit coupled to the dialer for coupling the dialer to the telephone line to initiate a call and then selectively coupling the telephone line to one of the voice terminal via a voice path and the fax terminal via a non-voice path; and a central processing unit for generating at least one of commands and status information and generating in response to the commands or status information switch unit control signals for controlling the switch unit during the execution of a dialing operation to confirm the dialing operation to a user by transferring dial tone to the voice path.

16. The line interface circuit according to claim 15, wherein said line interface control unit is supplied with said power derived from said exchange system.

* * * * *